US006218933B1

(12) United States Patent
Josserand et al.

(10) Patent No.: US 6,218,933 B1
(45) Date of Patent: Apr. 17, 2001

(54) SECURITY SYSTEM FOR A MOTOR VEHICLE OPENING LEAF

(75) Inventors: Luc Josserand, Turin (IT); Thierry Benard, Paris (FR)

(73) Assignee: Valeo Securite Habitacle, Creteil Cedex (FR)

( * ) Notice: Subject to any disclaimer, the term of this patent is extended or adjusted under 35 U.S.C. 154(b) by 0 days.

(21) Appl. No.: 09/498,302

(22) Filed: Feb. 4, 2000

(30) Foreign Application Priority Data

Feb. 5, 1999 (FR) .................................................. 99 01399

(51) Int. Cl.[7] ..................................................... B60R 25/10

(52) U.S. Cl. .................... 340/426; 340/430; 340/825.31; 340/825.34

(58) Field of Search .............................. 340/426, 825.31, 340/825.34, 430; 307/10.1, 10.2, 10.3

(56) References Cited

U.S. PATENT DOCUMENTS 5,654,687 * 8/1997 LaBonde .............................. 340/426
5,682,135 * 10/1997 Labonde .............................. 340/426
6,075,294 * 6/2000 Van den Boom et al. .......... 307/10.1
6,093,978 * 7/2000 Benard et al. ...................... 307/10.2

FOREIGN PATENT DOCUMENTS 42 12 291 10/1993 (DE) .
196 33 894 2/1998 (DE) .
198 17 587 2/1999 (DE) .

OTHER PUBLICATIONS

French Search Report dated Oct. 6, 1999.

* cited by examiner

*Primary Examiner*—Daniel J. Wu
*Assistant Examiner*—Son Tang
(74) *Attorney, Agent, or Firm*—Morgan & Finnegan LLP

(57) ABSTRACT

The invention proposes a security system for a motor vehicle opening leaf, a handle of which comprises an external lever articulated to a handle support arranged on the inside of a bodywork panel, of the type in which the security system includes means for remotely detecting, by means of an electromagnetic signal, the presence of a user's hand near the handle, the detection means being arranged in a casing which is fixed by elastic snap-fastening on the outside of the handle support.

9 Claims, 4 Drawing Sheets

12
26
30
24
14
32
42
38
48
40
44
36
34
16
20
18
A1

42
88
84
49
86

61
62
54
44
38
47
56
40
80
54
42
14
61

SECURITY SYSTEM FOR A MOTOR VEHICLE OPENING LEAF

BACKGROUND OF THE INVENTION

The invention relates to a security system for a motor vehicle opening leaf including means for detecting the approach of a user's hand.

The invention relates more particularly to a security system for a motor vehicle opening leaf, of the type in which the system comprises a handle, of which an external lever for grasping is articulated to a handle support arranged on the inside of a bodywork panel, the lever being moved by a user from a position of rest as far as a position of opening so as to operate a lock which keeps the opening leaf in the closed position, of the type in which the security system includes means for remotely detecting, by means of an electromagnetic signal, the presence of a user's hand near the handle, and of the type in which the detection means include a control circuit and at least one sensor capable of emitting or of receiving the electromagnetic signal.

BRIEF SUMMARY OF THE INVENTION

More specifically, the object of the invention is to propose a design of detection means which allow easy integration of the security system into the opening leaf when the vehicle is being constructed.

Specifically, the problem involves being able to mount these detection means easily on the opening leaf while at the same time ensuring the correct relative positioning of the various components of the security system and while at the same time guaranteeing that the detection means which involve sensors and electronic circuits which are somewhat delicate are appropriately protected.

To this end, the invention proposes a security system for a motor vehicle opening leaf, of the type in which the system comprises a handle, of which an external lever for grasping is articulated to a handle support arranged on the inside of a bodywork panel, the lever being moved by a user from a position of rest as far as a position of opening so as to operate a lock which keeps the opening leaf in the closed position, of the type in which the security system includes means for remotely detecting, by means of an electromagnetic signal, the presence of a user's hand near the handle, and of the type in which the detection means include a control circuit and at least one sensor capable of emitting or of receiving the electromagnetic signal, wherein the detection means are arranged in a casing which is fixed by elastic snap-fastening on an external face of the handle support so that a window made in an external face of the casing lies facing a window formed in the bodywork panel.

According to other features of the invention:

- the casing includes positioning pegs which extend transversely inward from an internal face of the casing and which are intended to be housed in corresponding orifices formed in the external face of the handle support;
- the support includes elastic tabs which extend transversely outward and which collaborate with catching lugs of the casing so as to fasten the casing to the support;
- the casing is produced by injection-molding of plastic, and includes a connector body molded integrally so as to allow the control circuit to be connected to an antitheft unit;
- the connector body extends vertically as a downward protrusion from a main body of the casing in which the control circuit and the sensor are arranged;
- the connector body extends roughly in a plane which is parallel to the plane of the bodywork panel and which is offset transversely outward with respect to a plane in which the main body of the casing extends;
- the window in the casing is delimited by a tubular wall which extends transversely outward and on which there is overmolded a seal intended to collaborate with a complementary tubular skirt belonging to a cover which is made of a material that is transparent to the electromagnetic signal and which closes off the window in the bodywork panel;
- the detection means include a switch which is intended to be operated by an actuator of the security system, the switch is arranged inside the casing facing an opening which is formed inside the internal face of the casing and which lies facing a corresponding opening formed in the handle support so that the switch can be operated by the actuator through the two corresponding openings; and
- the actuating opening formed in the casing is closed in leaktight fashion by a flexible membrane which is deformed by the actuator to operate the switch.

BRIEF DESCRIPTION OF THE DRAWINGS

Other features and advantages of the invention will become apparent from reading the detailed description which follows, for an understanding of which reference will be made to the appended drawings, in which.

DETAILED DESCRIPTION OF THE INVENTION

Figure 1:
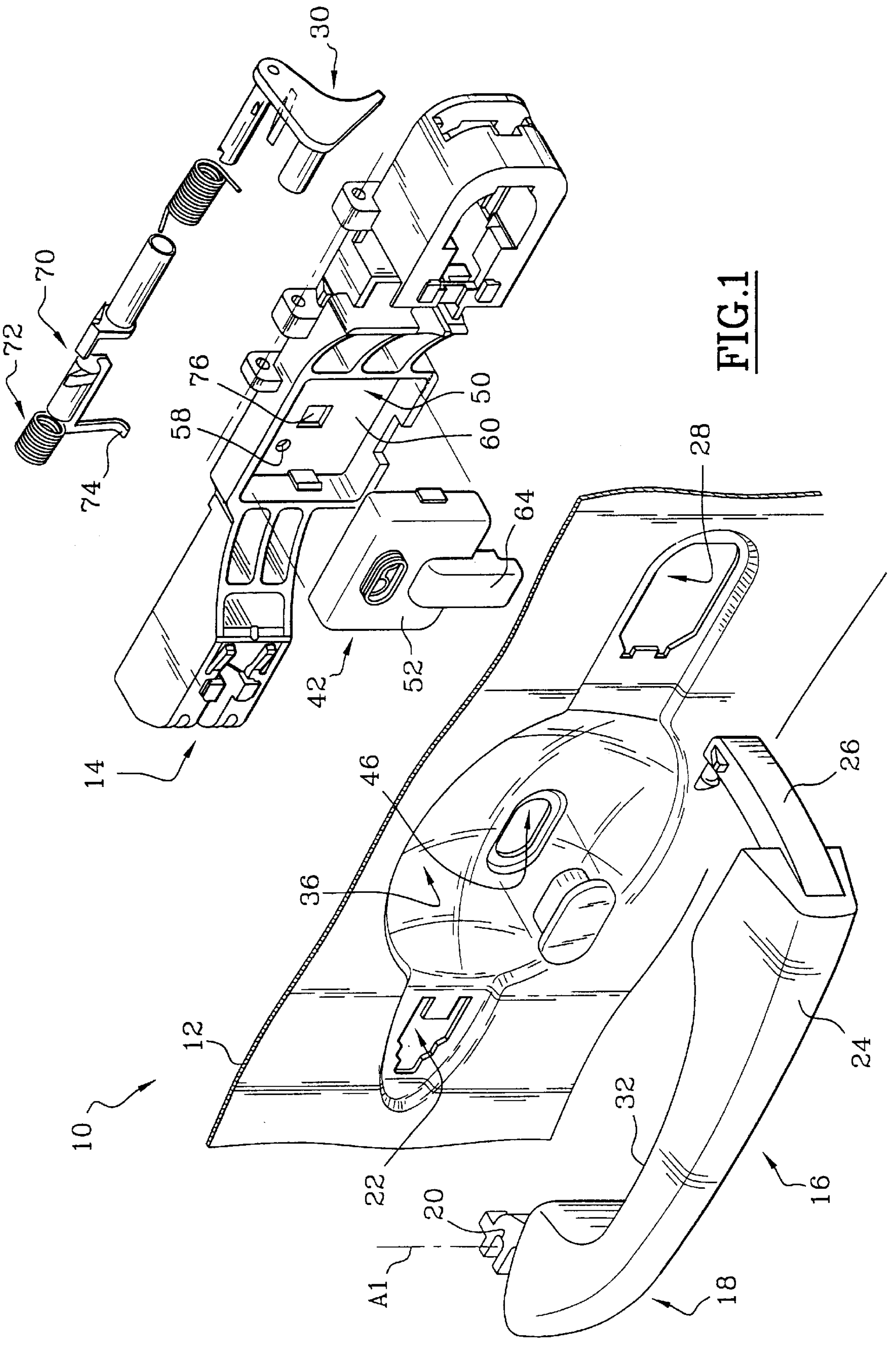
FIG. 1 is a view in exploded perspective of the main components of a security system for a motor vehicle opening leaf according to the teachings of the invention.

FIG. 1 illustrates a motor vehicle security system 10 including a handle for the opening leaf of a motor vehicle.

The handle includes a handle support 14 which is intended to be fastened to an outer bodywork panel 12 of the opening leaf, more particularly on an internal face thereof. A lever 16 for grasping is intended to be mounted on the outside of this panel 12, being articulated to the support 14 by a front longitudinal end 18, about an axis Al.

To do this, the front end 18 of the lever 16, which is roughly in the shape of a bar directed longitudinally, includes a pull bar 20 intended to be engaged through a front orifice 22 in the bodywork panel 12, so as to be mounted so that it can rotate on the support 14.

The rear end 24 of the grasping lever 16 includes a rear leg 26 which extends transversely inward through a rear orifice 28 formed in the panel 12 so as to collaborate with a linkage, a bellcrank 30 of which has been depicted in FIG. 1.

A user can thus manipulate the grasping lever by grasping hold of a roughly central part of the lever 16 and pulling it transversely outward from a position of rest as far as a position of opening. During this rotational movement about the axis Al of the lever 16, the rear leg 26 is intended to cause the bellcrank 30 to rotate about the axis A2 between a position of rest and a position of opening, which positions correspond to those of the grasping lever 16.

The bellcrank 30 makes it possible, for example, to open a lock, via a cable (not depicted)

To bring the lever for grasping toward its position of opening, the user of the vehicle has therefore to insert his hand between the bodywork panel 12 and a surface 32 for grasping the lever 16 so as to be able to pull this lever toward him, outward with respect to the panel 12. To do this, there is a space 34 between the panel 12 and the lever 16 which space, in a plane perpendicular to the axis Al, is delimited transversely by an inward depression 36 in the panel 12 and by the surface 32 for grasping the lever 16, which face one another.

According to the teachings of the invention, the security system includes detection means which are able to detect the presence of the user's hand in the space 34 before this user has actually grasped hold of the lever 16 via its grasping surface 32, and which are borne by the handle support 14 arranged on the internal face side of the panel 12.

Figures 2, 3, 4:
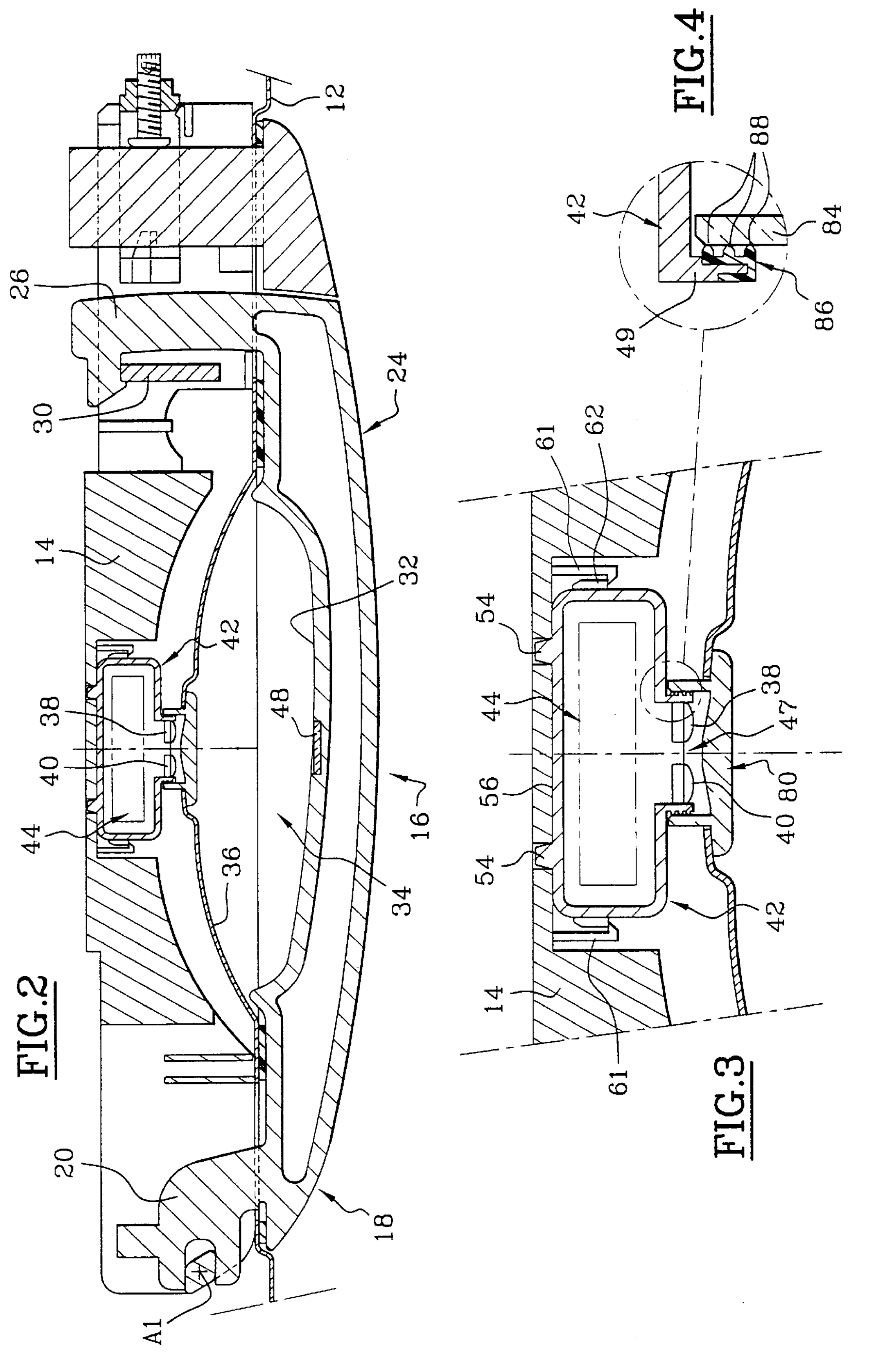
FIG. 2 is a view in cross section on a longitudinal and transverse plane of the security system of FIG. 1, once mounted on the opening leaf.
FIG. 3 is a detail view of FIG. 1, more particularly illustrating the fastening of the casing containing the detection means to the handle support.
FIG. 4 is a detail view of FIG. 3, more particularly illustrating the means providing sealing between the casing of the detection means and the cover which closes off the window in the bodywork panel.
Figure 5:
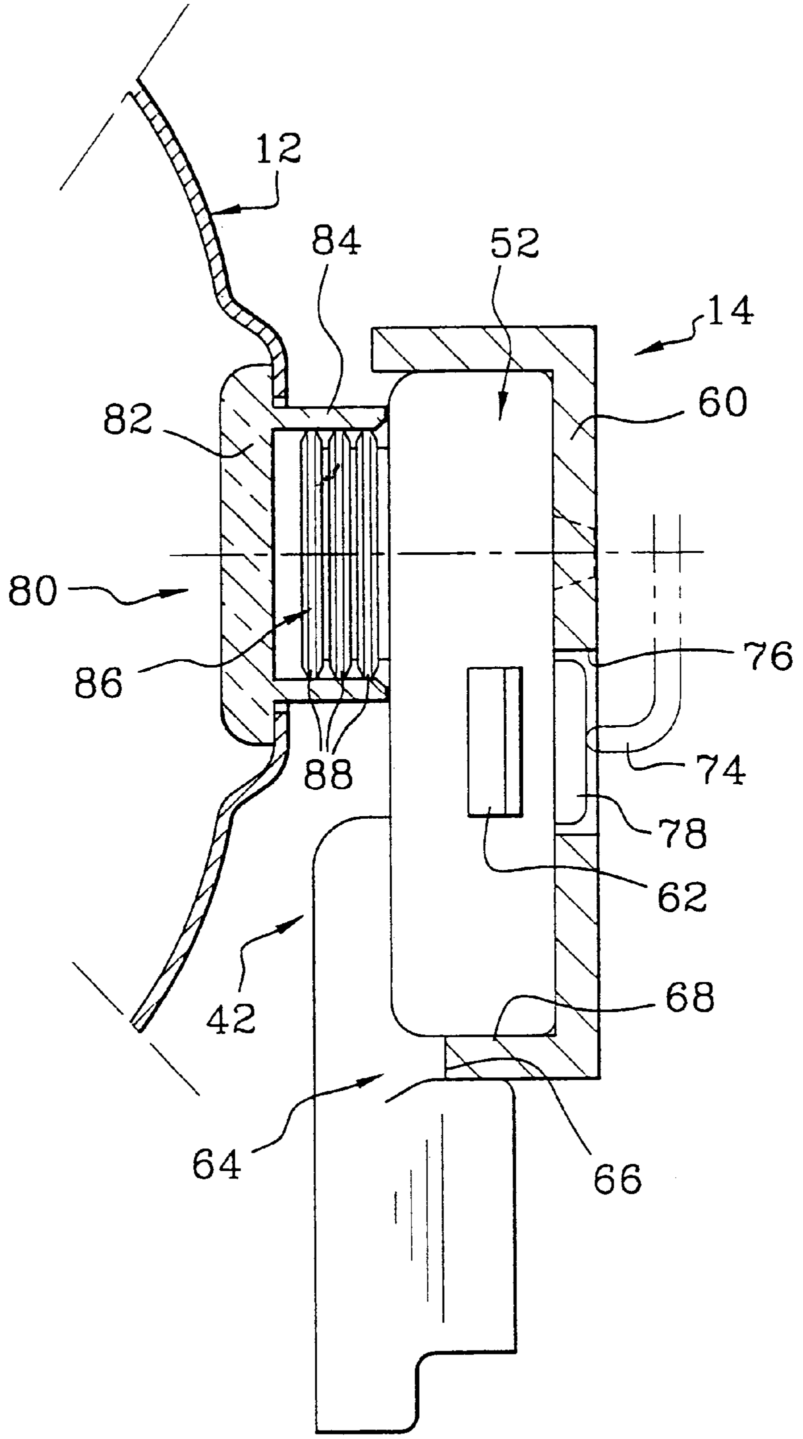
FIG. 5 is a diagrammatic view in part section on a vertical and transverse plane, more particularly illustrating the mounting of the casing on the handle support.
Figure 6:
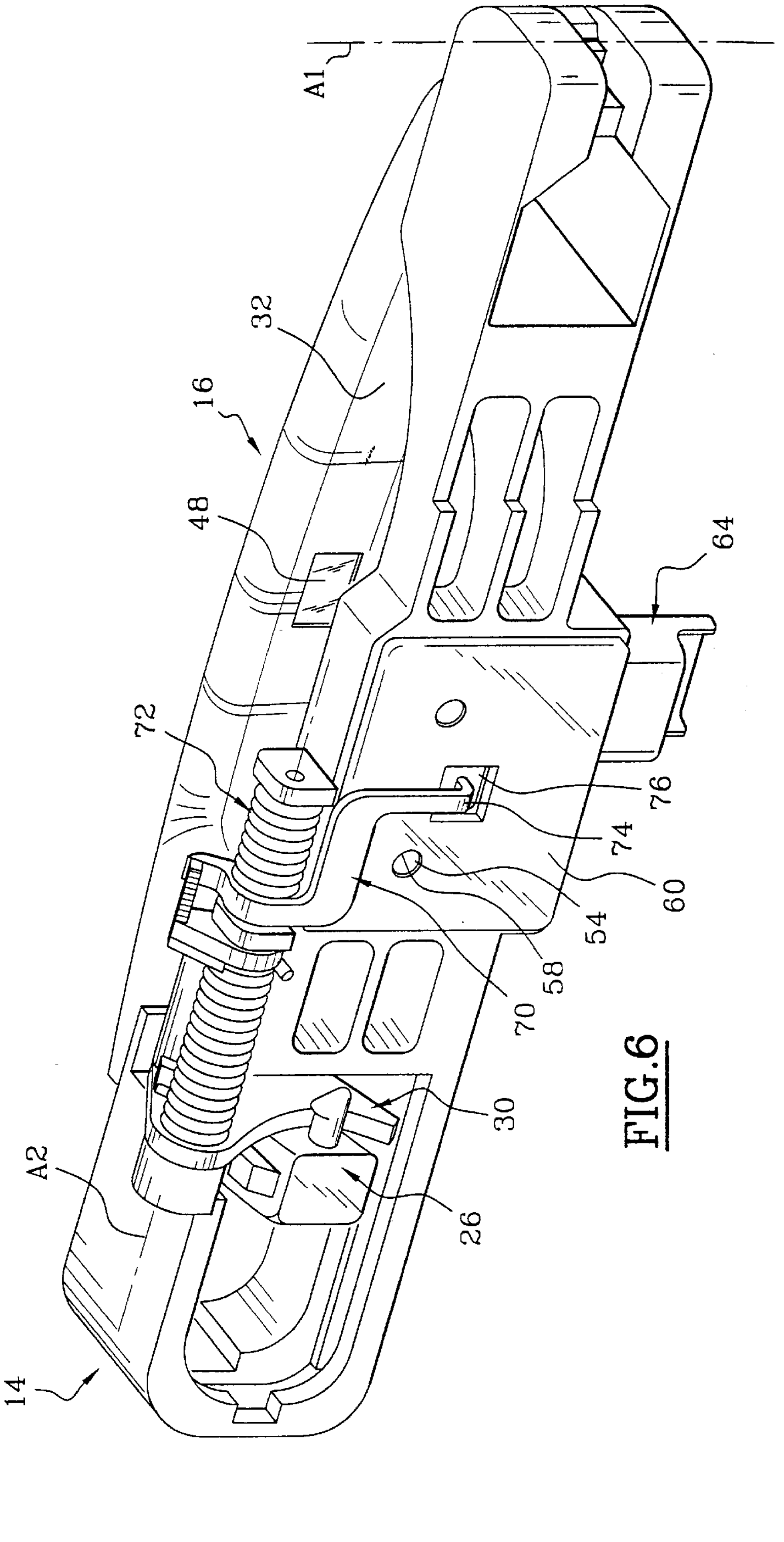
FIG. 6 is a view in perspective from the inside illustrating the operating means by which a lever of the handle can operate a switch arranged inside the casing of the detection means.

More specifically, and as can be seen in FIGS. 2 and 3, detection means in particular include an emitter 38 and a receiver 40 which are borne by a casing 42 itself fastened to the handle support 14. The emitter 38 and the receiver 40 are both connected to an electronic control module 44 which is arranged inside the casing 42.

In the embodiment illustrated, the emitter 38 emits a signal of the electromagnetic type which is intended to be received by the receiver 40. The signal is emitted in such a way as to follow a path which extends through the space 34 so that, when the user's hand enters this space 34, it has of necessity to cross the path of the signal so that the transmission of the signal between the emitter and the receiver is broken. The receiver 40, no longer receiving the signal, deduces from this information relating to the presence of the hand in this space 34.

The signal emitted by the emitter 38 is, for example, a light signal in the infrared domain. In the example illustrated, the emitter 38 and the receiver 40 are arranged roughly side by side set back toward the inside with respect to the bodywork panel. They are arranged facing a window 46 which is cut in the indentation 36 in the bodywork panel 12. In the embodiment illustrated, the emitter and the receiver are arranged facing the same window 46. The signal emitted by the emitter 38 is therefore directed toward the outside through the window 46 in the panel 12 and a reflector 48 is provided, borne by the lever 16, which reflects the signal back toward the receiver 40, again through the window 46.

According to the teachings of the invention, the casing 42 which combines the detection means together is intended to be fastened to the support 14 by simple elastic snap-fastening. More specifically, it can be seen that the support 14 includes, on its external face side facing the panel 12, a recessed recess 50 which is roughly of a shape that complements that of the casing 42, more specifically of a shape that complements that of a main body 52 of the casing 42. In this particular instance, the main body 52 is roughly parallelepipedal.

As can be seen in FIGS. 2 and 3, the casing 42 can be engaged transversely from the outside inward into the recess 50 and has positioning pegs 54 which extend transversely inward from an internal face 56 and which are intended to be housed in corresponding orifices 58 made in the external face 60 of the handle support 14 which in this particular instance forms the closed end of the recess 50.

The two positioning pegs 54 thus make it possible to position, on the one hand, the casing 42 bearing the emitter 38 and the receiver 40 with respect to, on the other hand, the handle support 14, with great precision.

To fasten the casing 42 to the support 14 there are two elastic tabs 61 which extend transversely outward from the closed end of the recess 50 and the hook-shaped free end of which is intended to collaborate with catching lugs 62 formed on lateral faces of the main body of the casing 42.

The casing 42 is thus fastened onto the support 14 by simple elastic snap-fastening or clipping.

The casing 42 includes, in addition to the main body 52, a connector body 64. The connector body contains connection pins by means of which the control circuit 44 of the detection means is intended to be connected to, on the one hand, an electrical power supply and, on the other hand, an antitheft unit (not depicted).

Advantageously, the main body 52 and the connector body 64 are formed integrally as one single piece by the injection-molding of plastic. As can be seen, the main body 52 extends roughly in a plane parallel to the plane of the bodywork panel 12 and the connector body 64 extends vertically downward, open toward the bottom. However, the connector body 64 extends in a plane which is parallel to but offset transversely outward from the plane in which the main body 52 extends.

Thus, the connector body 64, which extends out of the recess 50 has, at the point where it meets the main body 52, a smaller transverse thickness which delimits a longitudinal slit 66 which is open transversely inward. This slit 66 is intended to take an element 68 of a sidewall of the support 14 which delimits the recess 50.

Thus, by virtue of the offset of the connector body and by virtue of the presence of the slit 66, it is possible to maintain right around the recess 50 a sidewall which is continuous and provides the support 14 with good rigidity.

Furthermore, the detection means include a switch which is arranged inside the casing 42. This switch is intended to be operated by an actuator 70 connected to the lock opening linkage. Specifically, such a switch may, for example, be used to back up any failure of the remote detection system which uses the electromagnetic signal.

In the example illustrated, it may be seen that the actuator 70 is a rocking actuator articulated about the same axis A2 as the bellcrank 30 of the linkage. When the bellcrank 30 is in the position of rest, it forces the actuator 70 toward an inactive position, against elastic return means 72. As soon as the bellcrank 30 leaves its position of rest, the elastic means 72 can urge the actuator 70 to rotate about the axis A2 toward an active position in which an actuating finger 74 of the actuator 70, which extends on the inside of the support 14, moves transversely outward.

According to the invention, the switch is arranged in the casing in such a way as to lie just facing a window made in the internal face 56 of the casing 42, which window lies facing a corresponding window 76 made in the internal face 60 of the support 14 which forms the closed end of the recess 50. Advantageously, the window of the casing 42 is closed in a sealed manner by a flexible membrane 78.

Thus the actuating finger 74 can transversely penetrate from the inside outward through the window 76 of the support 14 so as to deform the membrane 78 and actuate the switch arranged in the casing 42.

Furthermore, it can be seen in the figures that the emitter 38 and the receiver 40 are arranged facing a window 47 which is made in an external face of the main body 52 of the casing 42 and which corresponds to the window 46 in the bodywork panel 12 so that the two sensors can "watch" the space 34. Around the window 47 there is a tubular wall 49 which extends axially outward toward the panel 12, without reaching the latter.

In the example illustrated, the window 46 in the bodywork panel 12 is intended to be closed off by a cover 80, an external transverse wall 82 of which extends roughly parallel to the bodywork panel 12, on the outside thereof. Of course, the external transverse wall 82 of the cover 80 is made of a material which is transparent to the electromagnetic signal.

The cover 80 includes a tubular skirt 84 which extends axially inward from the external transverse wall 82, through the window 38 in the panel 12. The internal end of the skirt 84 is intended to surround the tubular wall 49 of the casing 42, on the outside, and there are sealing means inserted between the tubular wall 49 of the casing 42 and the tubular skirt 84 of the cover 80 to prevent dust or moisture from being able to enter the casing 42.

As can be seen in FIG. 4, the sealing means may, for example, be produced in the form of a seal 86 of elastomeric material overmolded around the external end of the tubular wall 49. This seal 86 in this particular instance has three lips 88 directed radially outward, these three lips being concentric and transversely offset from one another. These lips 88 are intended to come into contact with the tubular skirt 84 of the cover 80, to provide sealing.

What is claimed is:

1. A security system for a motor vehicle opening leaf, of the type in which the system comprises a handle, of which an external lever for grasping is articulated to a handle support arranged on the inside of a bodywork panel, the lever being moved by a user from a position of rest as far as a position of opening so as to operate a lock which keeps the opening leaf in the closed position, of the type in which the security system includes a detection member including a control circuit and at least one sensor capable of emitting or of receiving an electromagnetic signal, wherein the detection member is arranged in a casing which is fixed by elastic snap-fastening on the handle support so that a window made in an external face of the casing lies facing a window formed in the bodywork panel.

2. The security system according to claim 1, wherein the casing includes positioning pegs which extend transversely inward from an internal face of the casing and which are intended to be housed in corresponding orifices formed in the external face of the handle support.

3. The security system according to claim 1, wherein the support includes elastic tabs which extend transversely outward and which collaborate with catching lugs of the casing so as to fasten the casing to the support.

4. The security system according to claim 1, wherein the casing includes an integral connector body configured to allow the control circuit to be connected to an antitheft unit.

5. The security system according to claim 4, wherein the connector body extends as a protrusion from a main body of the casing in which the control circuit and the sensor are arranged.

6. The security system according to claim 5, wherein the connector body extends roughly in a plane which is parallel to the plane of the bodywork panel and which is offset transversely outward with respect to a plane in which the main body of the casing extends.

7. The security according to claim 1, wherein the window in the casing is delimited by a tubular wall which extends transversely outward and on which there is disposed a seal intended to collaborate with a complementary tubular skirt belonging to a cover which is made of a material that is transparent to the electromagnetic signal and which closes off the window in the bodywork panel.

8. The security system according to claim 1, wherein the detection member includes a switch which is intended to be operated by an actuator of the security system, the switch is arranged inside the casing facing an opening which is formed in the internal face of the casing and which lies facing a corresponding opening formed in the handle support so that the switch can be operated by the actuator through the two corresponding openings.

9. The security system according to claim 8, wherein the actuating opening formed in the casing is closed in leaktight fashion by a flexible membrane which is deformed by the actuator to operate the switch.

* * * * *